(12) United States Patent
Roth

(10) Patent No.: US 6,604,105 B1
(45) Date of Patent: Aug. 5, 2003

(54) PROCESSING A DIRECTED GRAPH OF OBJECTS

(75) Inventor: Jason A. Roth, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 167 days.

(21) Appl. No.: 09/671,947

(22) Filed: Sep. 27, 2000

(51) Int. Cl.$^7$ .................. G06F 17/00; G06T 11/20; G09G 5/00
(52) U.S. Cl. .................. 707/100; 707/102; 345/655; 345/440
(58) Field of Search .................. 707/1, 100, 205, 707/103 R, 103, 103 Z, 103 Y, 516; 345/655, 666, 440

(56) References Cited

U.S. PATENT DOCUMENTS 5,414,809 A * 5/1995 Hogan et al. ............... 345/440
6,226,637 B1 * 5/2001 Carey et al. ................. 707/4
6,295,367 B1 * 9/2001 Crabtree et al. ............ 382/103

* cited by examiner

*Primary Examiner*—Alford W. Kindred
(74) *Attorney, Agent, or Firm*—Fish and Richardson, P.C.

(57) ABSTRACT

A method of identifying the type of an object that has a set of properties, each of which is assigned a value, includes: receiving a first set of properties characteristic of a type of object, the first set of properties being divided into a subset of sufficient properties and a subset of additional properties; and determining whether the object is of the first type based only on whether the properties in the subset of sufficient properties are matched by the object. The first type of object is associated with a representation of a document as a directed graph of objects.

26 Claims, 13 Drawing Sheets

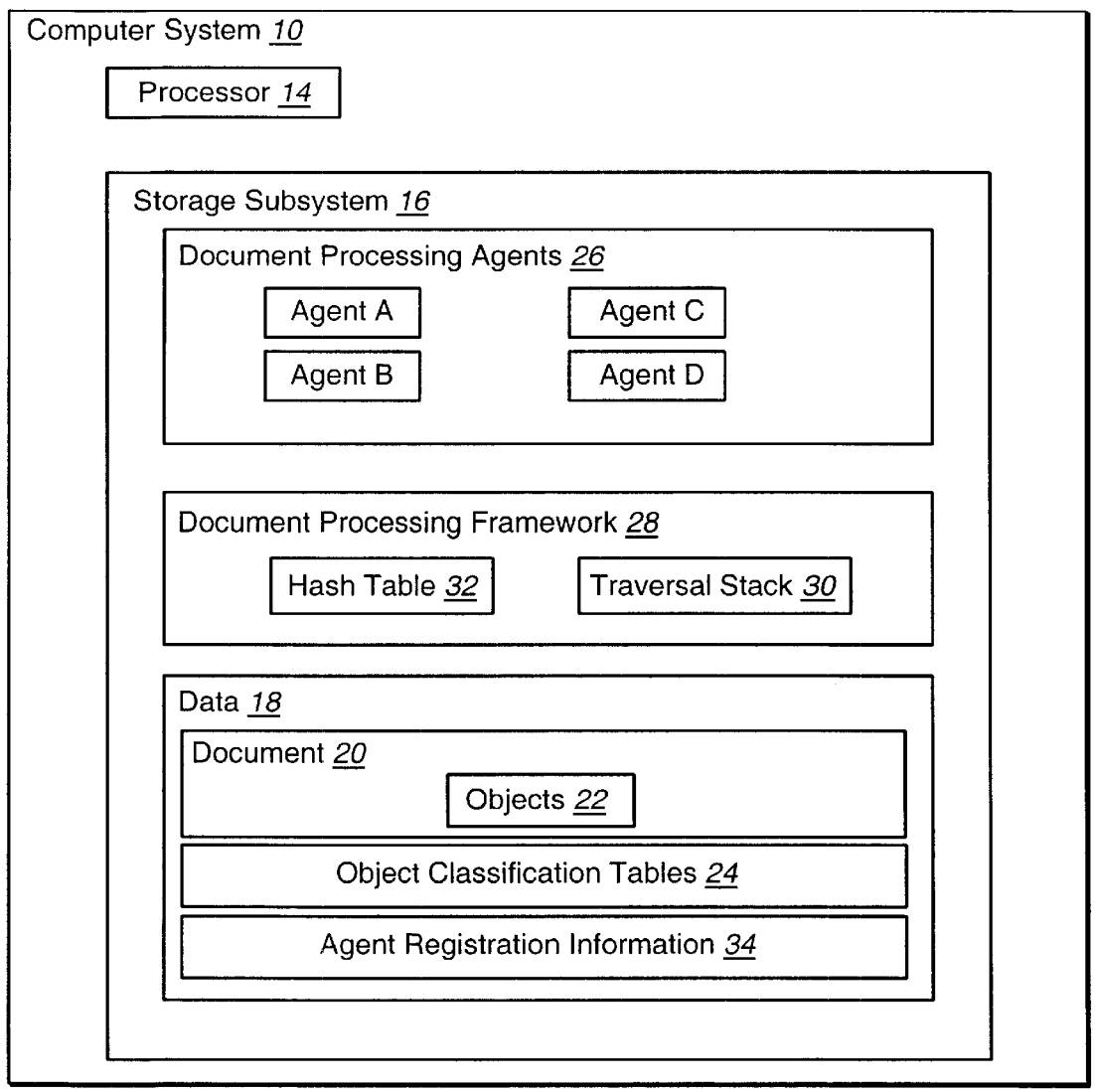
FIG._1

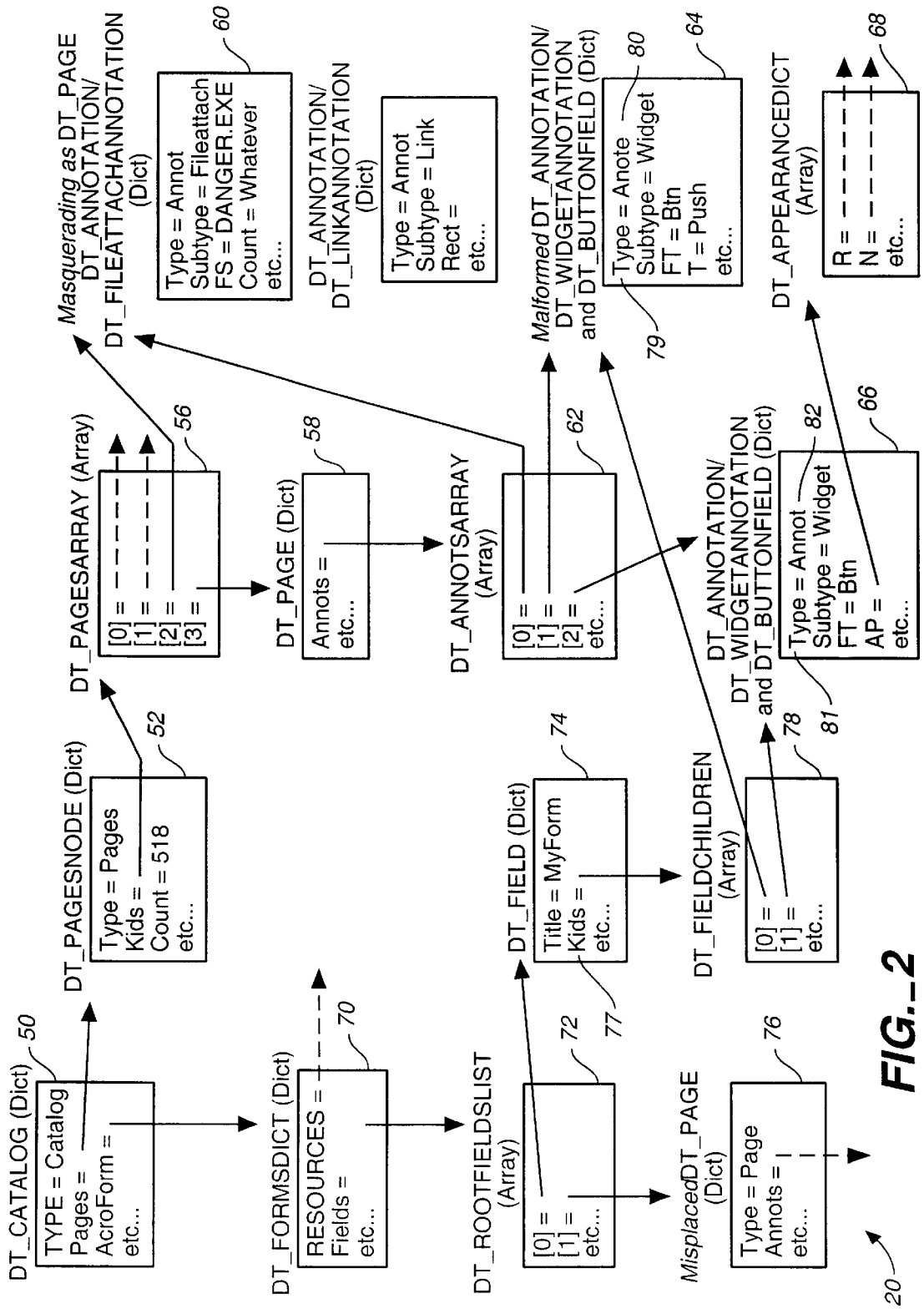
FIG._2

Agent A: String Translator

| Object Types of Interest | Want Object Type Subclasses | Revisitation Mode |
|---|---|---|
| DT_COSSTRING | N/A | Revisit None |

*92* encompasses the above table. Column headers marked 100, 102, 104.

Agent B: Cataloging Agent

| Object Types of Interest | Want Object Type Subclasses | Revisitation Mode |
|---|---|---|
| DT_ALL | N/A | Revisit Unknown |

*94*

Agent C: Document Safety Agent

| Object Types of Interest | Want Object Type Subclasses | Revisitation Mode |
|---|---|---|
| DT_FILEATTACHANNOTATION, DT_LAUNCHACTION, DT_GOTORACTION, DT_URIACTION (106) | Yes (108) | Revisit if Reclassified |

*98*

Agent D: Document Validation Agent

| Object Types of Interest | Want Object Type Subclasses | Revisitation Mode |
|---|---|---|
| DT_ALL | N/A | Revisit if Reclassified, Always Revisit Unknown |

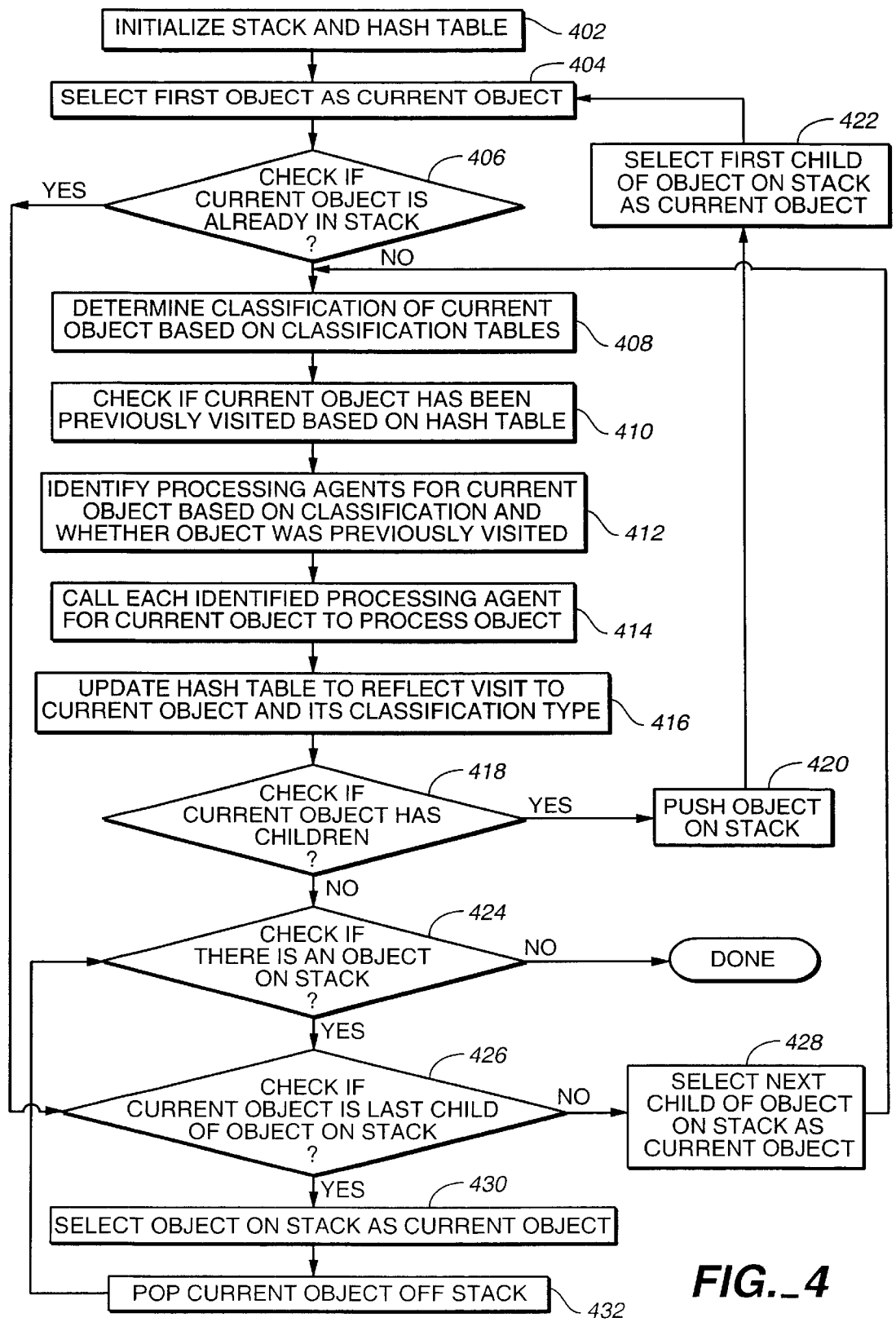
FIG._4

Sample Document Parse Table (Excerpt)

| Parent Type 126 | Basic Type 128 | Source Key 130 | Bonus Key/Values 132 | Lumped Key/Values 134 | Deduced Type 124 |
|---|---|---|---|---|---|
| DT_ANNOTATION | CosDict | AP* | RD | N | DT_APPEARANCEDICT |
| DT_ANNOTSARRAY | CosDict* | N/A | Type=Annot | N/A | DT_ANNOTATION$ 136 |
| DT_CATALOG | CosDict | AcroForm* | N/A | Fields | DT_FORMSDICT |
| DT_CATALOG | CosDict | Pages* 138 | Kids Count | Type=Pages | DT_PAGESNODE 139 |
| DT_FIELD | CosArray | Kids* | N/A | N/A | DT_FIELDCHILDREN |
| DT_FIELDCHILDREN | CosDict* | N/A | N/A | FT | DT_FIELD$ |
| DT_FORMSDICT | CosArray | Fields* | N/A | N/A | DT_ROOTFIELDSLIST |
| DT_PAGE | CosArray | Annots* | N/A | N/A | DT_ANNOTSARRAY |
| DT_PAGESARRAY | CosDict | N/A | Resources* | Type=Page | DT_PAGE |
| DT_PAGESNODE | CosArray | Kids* | N/A | N/A | DT_PAGESARRAY |
| DT_ROOTFIELDSLIST | CosDict* | N/A | N/A | FT | DT_FIELD$ |

*FIG._5A*

Sample Specific Type Determination Table (Excerpt)

| Type Value 146 | Subtype Value 148 | Deduced Type 144 |
|---|---|---|
| Annot | Link | DT_LINKANNOTATION |
| Catalog | N/A | DT_CATALOG |
| Page | N/A | DT_PAGE |

*FIG._5B*

Sample Specific to Generic Type Table

| Specific Type 154 | Generic Type 156 |
|---|---|
| DT_LINKANNOTATION | DT_ANNOTATION |
| DT_WIDGETANNOTATION | DT_ANNOTATION |
| DT_BUTTONFIELD | DT_FIELD |

*FIG._5C*

Sample Generic to Specific Type Table (Excerpt)

| Generic Type (Known) 166 | Key/Value Pairs 168 | Specific Type (Deduced) 164 |
|---|---|---|
| DT_ANNOTATION | Subtype=Widget | DT_WIDGETANNOTATION |
| DT_ANNOTATION | Dest A | DT_LINKANNOTATION |
| DT_FIELD | T FT=Bin | DT_BUTTONFIELD |

*FIG._5D*

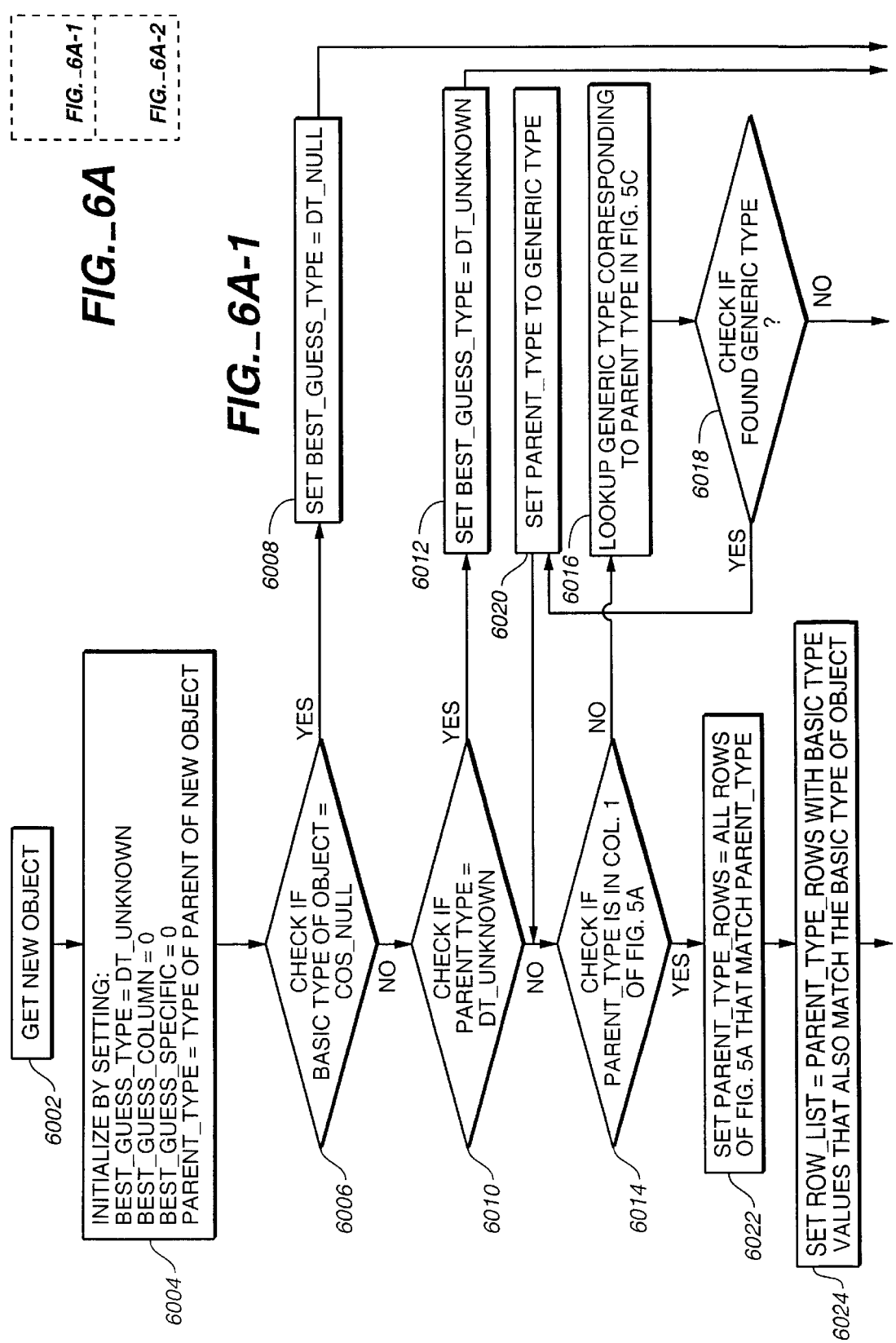

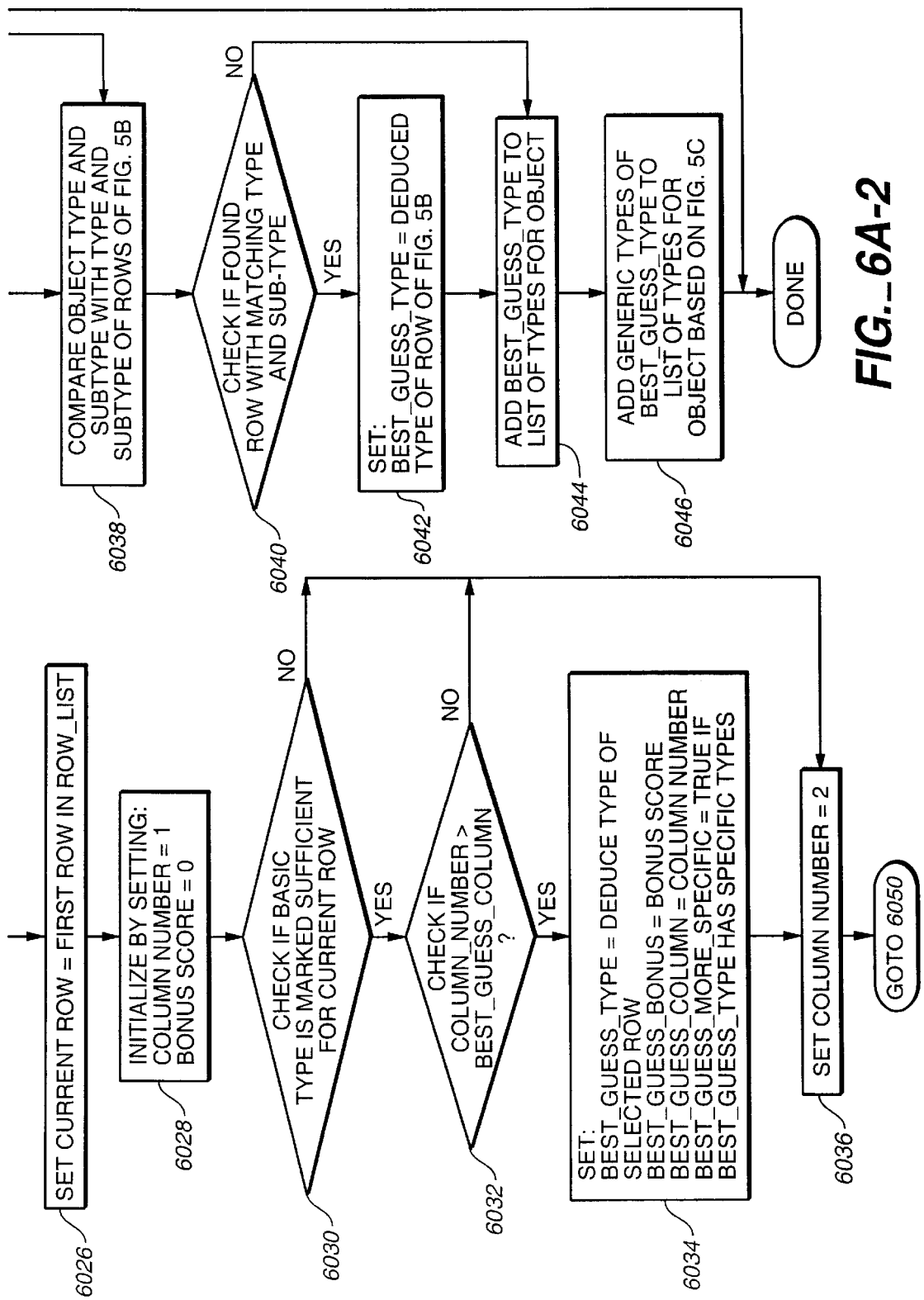
FIG._6A-2

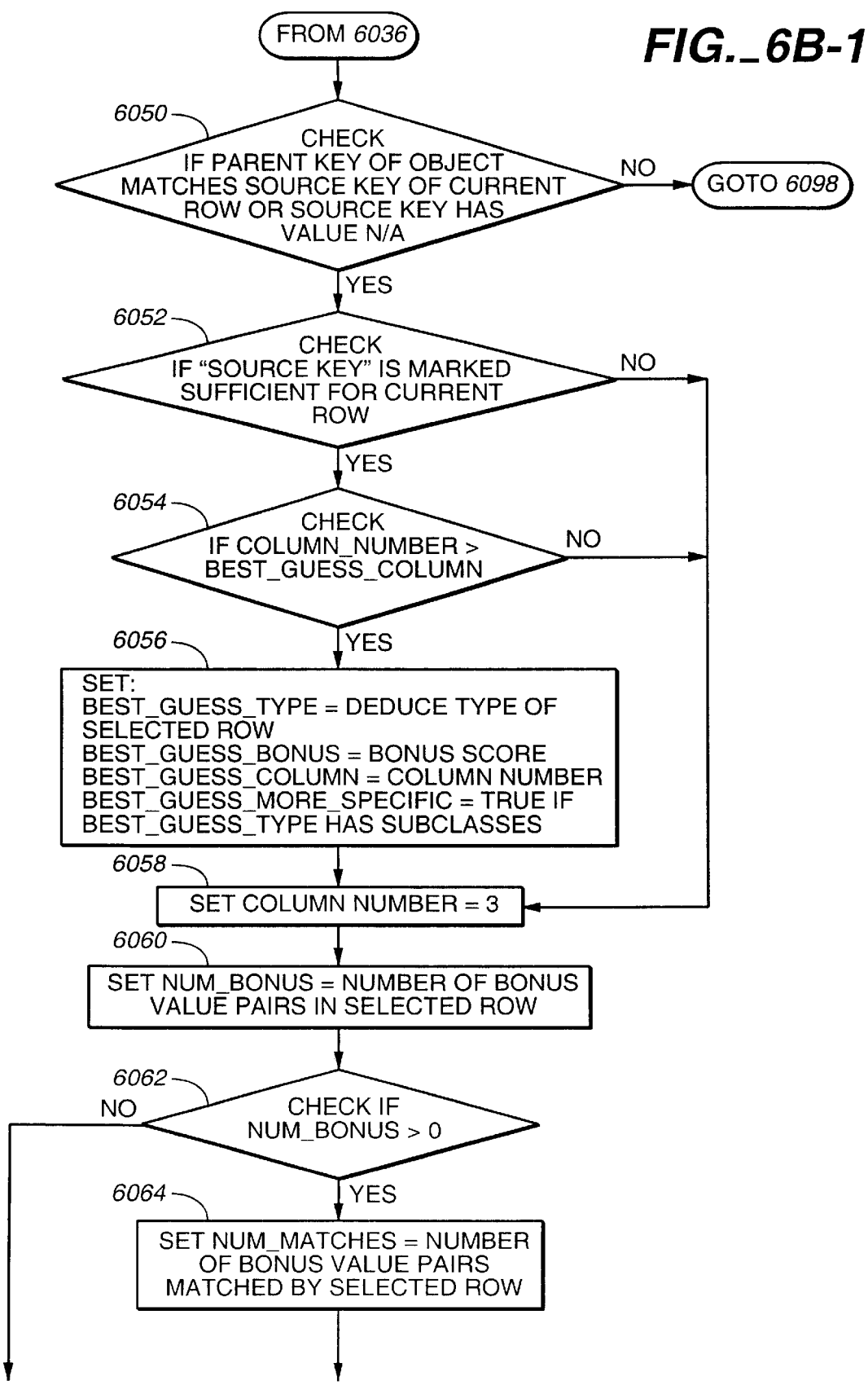
FIG._6B-1

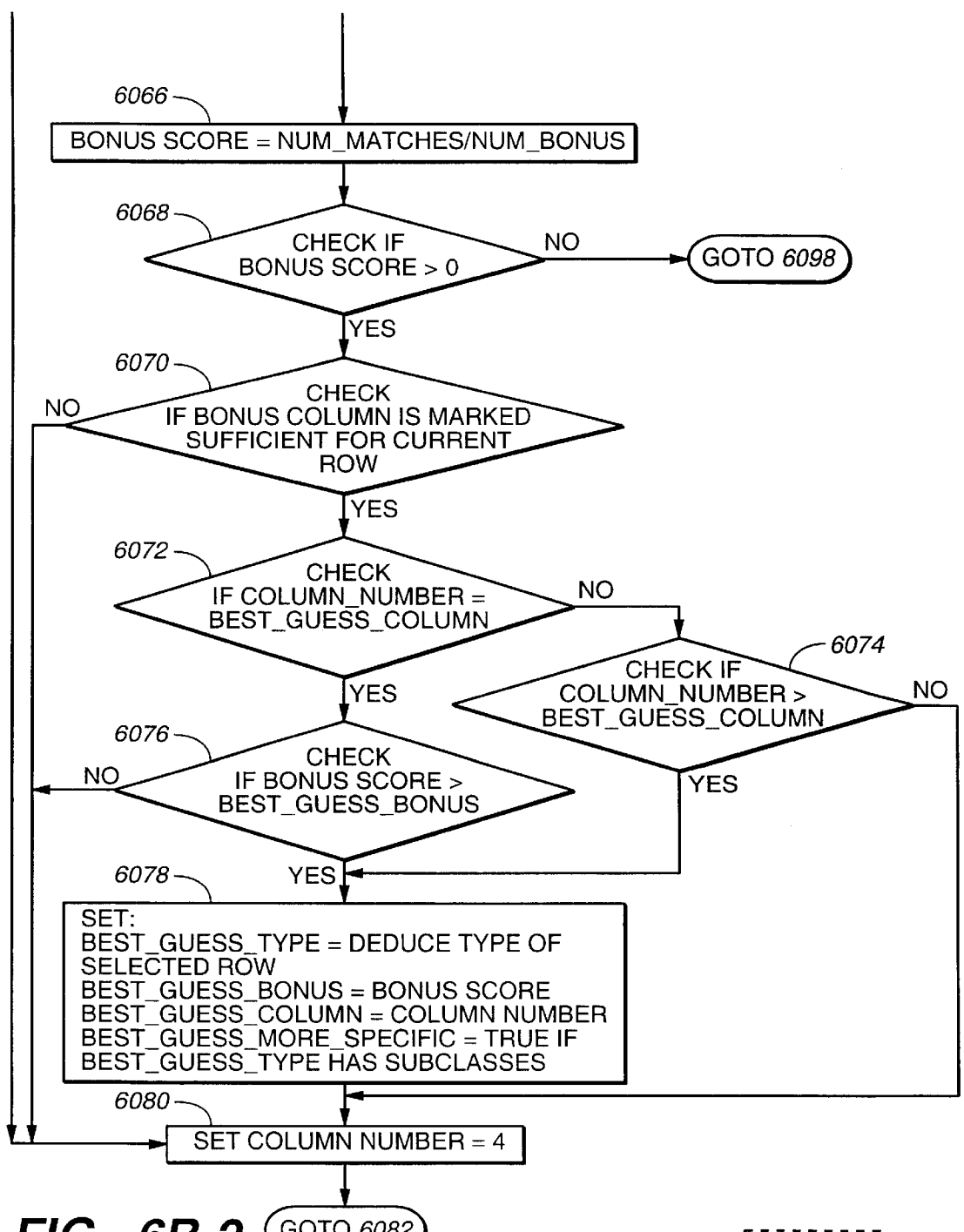
FIG._6B

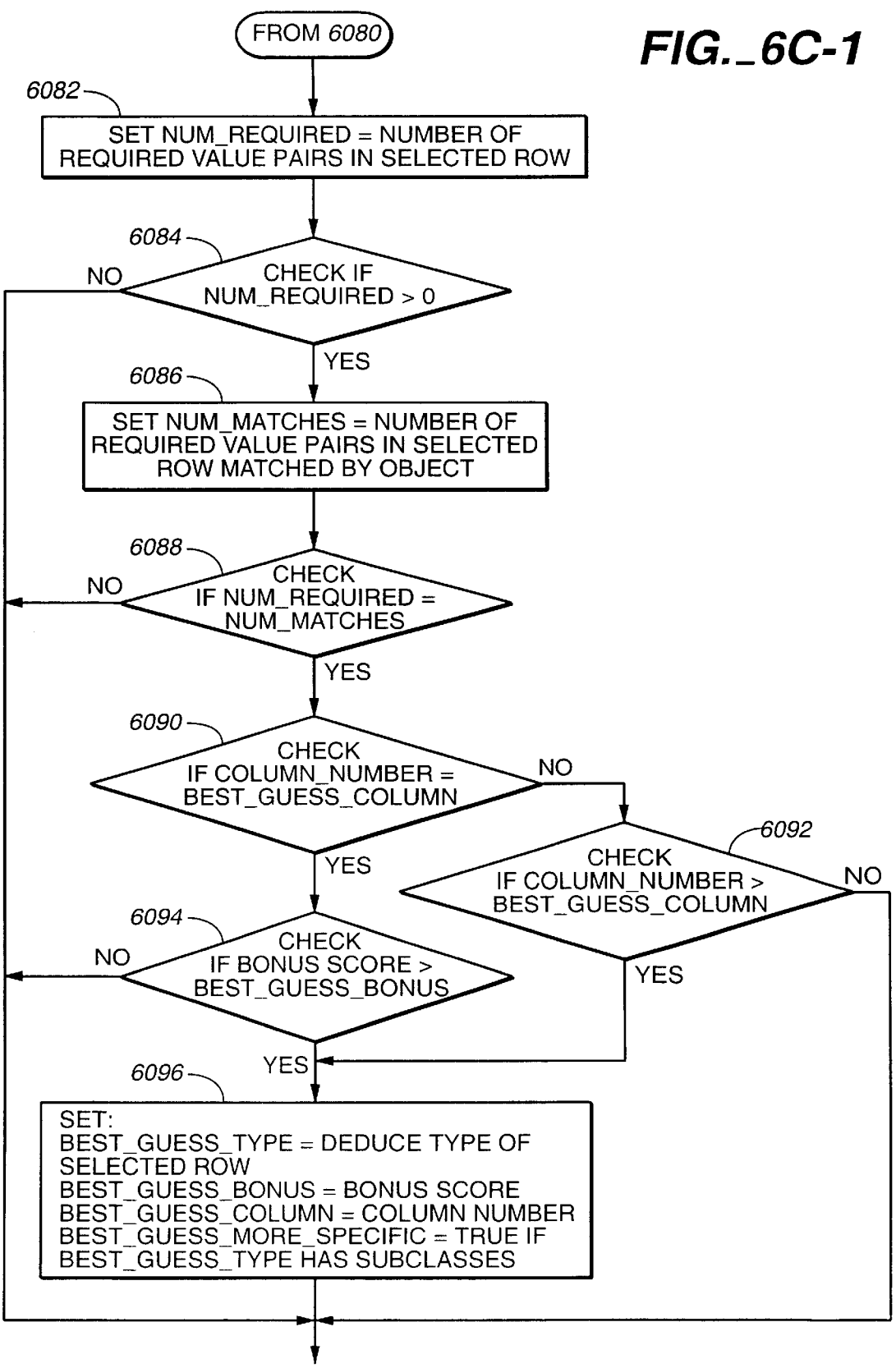
FIG._6C-1

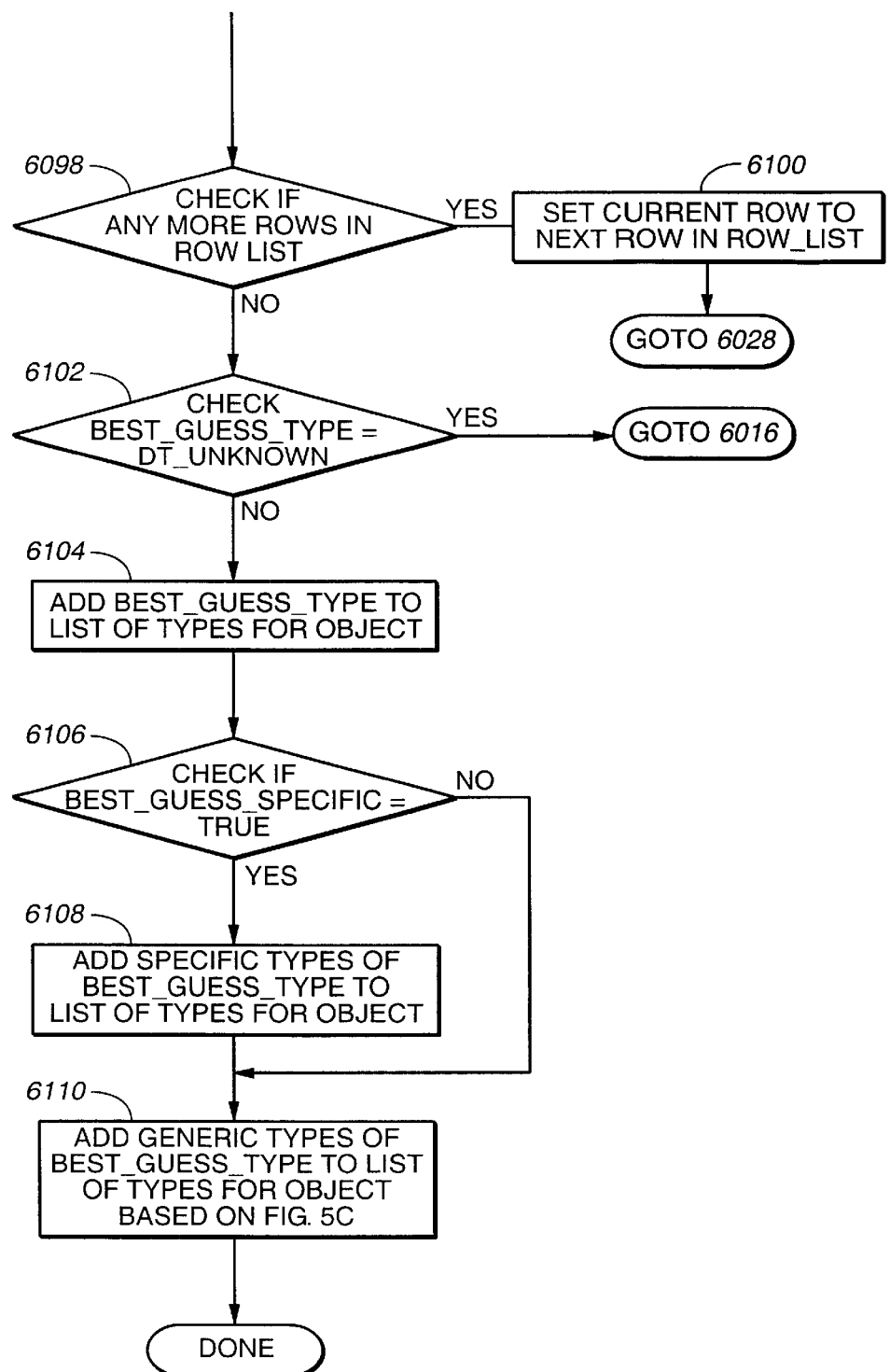
FIG._6C-2
FIG._6C-1
FIG._6C  FIG._6C-2

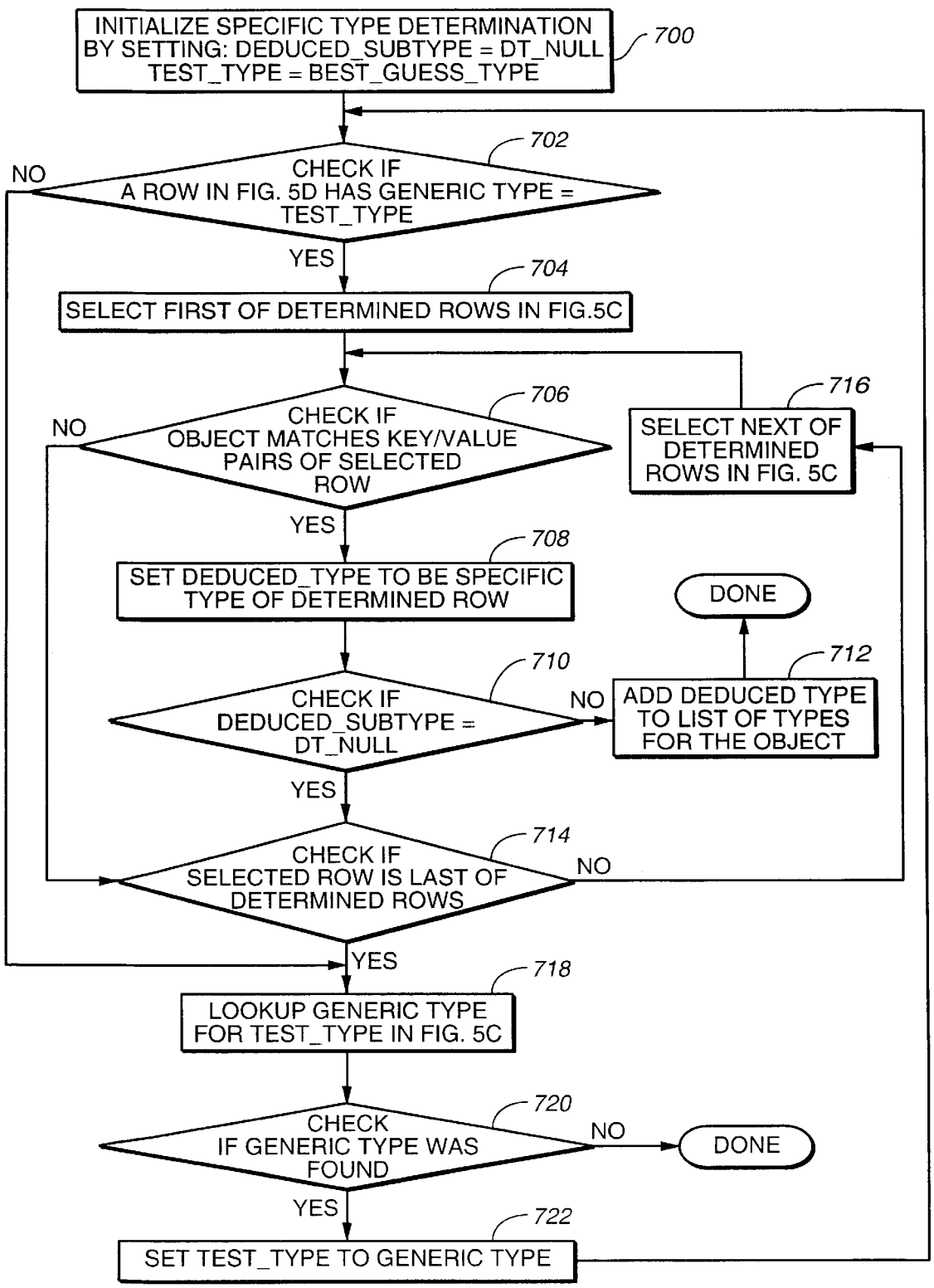
FIG._7A

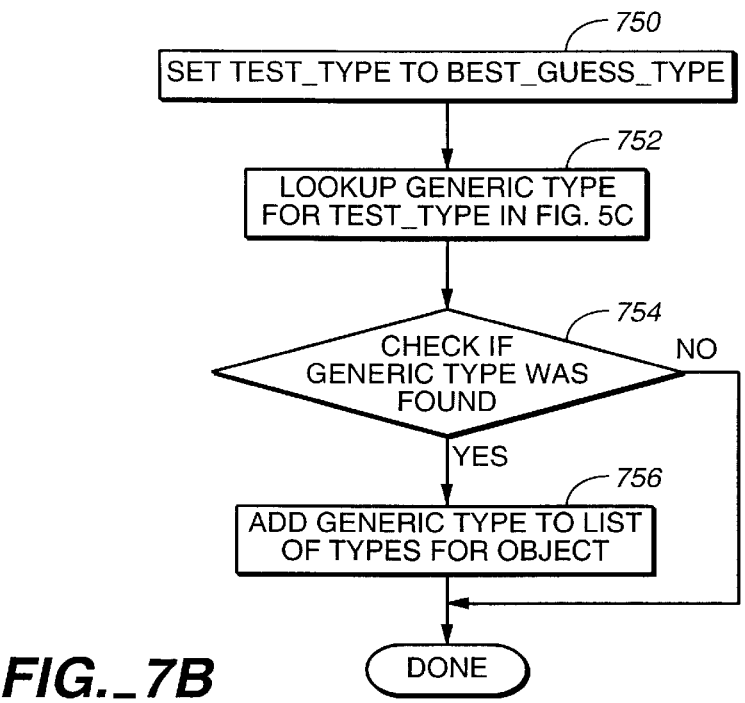
FIG._7B
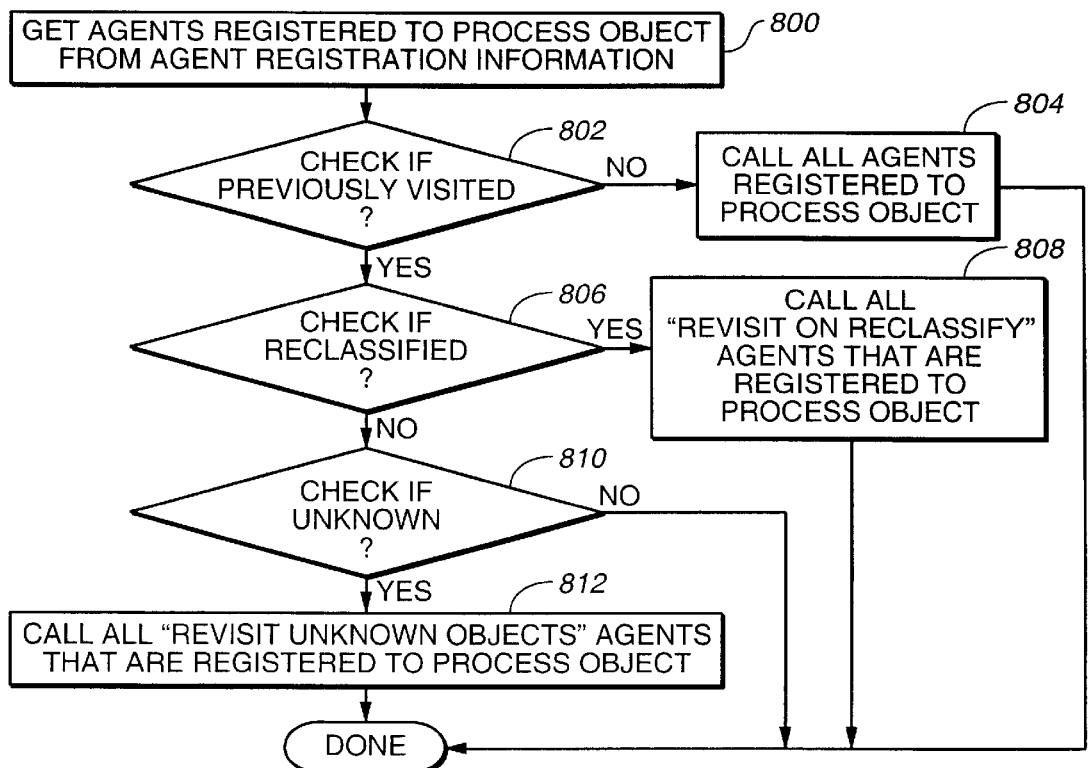
FIG._8

PROCESSING A DIRECTED GRAPH OF OBJECTS

TECHNICAL FIELD

This invention relates to processing a directed graph of objects.

BACKGROUND

Data is often represented as a directed graph of objects. For instance, many formats for documents represent the data in the document as objects that are related to each other by a directed graph. Examples of document formats implemented as directed graphs include Portable Document format ("PDF") developed by Adobe Systems Incorporated of San Jose, Calif. ("Adobe") and the document object model specification ("DOM") promulgated by the World Wide Web Consortium ("W3C") for representing hypertext markup language documents. The documents may be displayed by a document reader, such as Adobe Acrobat® Reader™, available from Adobe, which displays information contained within the directed graph of objects as prose.

It is sometimes necessary to process the objects in a directed graph. For example, in order to translate a PDF document, it may be necessary to translate objects in a directed graph that represent a document.

SUMMARY

The invention relates to a method of identifying the type of an object that has a set of properties. The type of object is associated with a representation of a document as a directed graph of objects. In one general aspect of the invention, the method includes: receiving a first set of properties characteristic of a type of object, the first set of properties being divided into a first subset of sufficient properties and a first subset of additional properties; and determining whether the object is of the first type based only on whether the properties in the first subset of sufficient properties are matched by the properties of the object.

By identifyig the type of the object based only on a subset of the properties that are designated as sufficient, the method can identify objects which may have some of their properties set incorrectly or may not have all of the properties associated with an object type.

In a second general aspect of the invention, a computer program product for identifying the type of an object according to the first aspect of the invention is tangibly stored on a computer-readable medium.

Embodiments of the invention may include one or more of the following features. Values associated with at least some of the properties in the first subset are received and the determination of whether the object is of the first type is further based on whether the values in the first subset match the values of the corresponding properties of the object. The first subset of properties includes a bonus group of properties. The properties in the bonus group are compared with the properties of the object. If at least one property in the bonus group is matched by the properties of the object then the object is identified as the first type. By basing the identification on only one matching value, the method can identify the type of an object that may have incorrect values for certain properties or may have certain properties missing.

The first subset of sufficient properties also includes a lumped group of properties. The values of the properties in the lumped group are compared with properties of the object. If the value of each property in the lumped group is matched by the properties of the object then the object is identified as the first type. The lumped group allows the person designing the set of properties to require that multiple properties of the object be correctly set for the object to be identified as the first type.

The first subset of sufficient properties includes a property of the parent of the object, such as an object type of the parent. Basing the identification on the parent type of the object, for example, makes the identification dependent on the position of the object within a directed graph of objects.

A second set of properties characteristic of a second type of object are received. The second set of properties is divided into a second subset of sufficient properties and a second subset of additional properties. It is determined whether the object is of the second type based only on whether the properties in the second subset of sufficient properties are matched by the properties of the object. The properties in the first set of properties are compared with the properties of the object to determine how many of the properties in the first set match corresponding properties of the object. Then properties in the second set of properties are compared with the properties of the object to determine how many of the properties in the second set are matched by the object. It is determined whether the first type or the second type is a preferred type of the object based on whether the object matches more of the properties in the first set of properties than in the second set of properties. Thus, the method selects the type that better matches the object.

A third general aspect of the invention relates to a computer program product that provides a framework for processing an electronic document. The product includes instructions that cause a programmable processor to perform the following operations. The processor receives an input identifying an electronic document having content organized as a directed graph of objects, with each object having a set of properties, each of which is assigned a value. The processor receives associating information associating one or more requested object types with a first computer program code module or agent. The processor traverses the directed graph, visiting objects in the electronic document. The processor identifies the type of each visited object to determine whether the visited object is of one of the requested object types. If the visited object is of one of the requested types, the processor invokes the first agent to process the visited object. If there is more than one path to an object in the directed graph, an object may be visited more than once in a traversal of the document and the instructions cause the processor to determine whether or not to invoke the agent on more than one of the visits based on the associating information.

Embodiments of the third aspect of the invention may include one or more of the following steps. The instructions cause the processor to identify the type of each visited object according to the method of the first aspect of the invention. The processor records an identity and a type of each visited object and the associating information directs the processor not to invoke the agent on a visit to an object whose identity has already been recorded. Alternatively, the associating information may direct the processor to only invoke the agent on a visit to an object whose identity has already been recorded if the previously recorded type of the object is different from the identified type of the object. By revisiting an object whose inferred type has changed, the framework may be used to detect potentially dangerous objects that are embedded in a document and masqueraded as the previously recorded type.

The instructions further cause the processor to operate as follows. The processor receives information associating one or more object types with a second computer code program code module or agent. The processor determines whether a visited object is associated with the second agent based on the identified type of the visited object. If the visited object is of the requested type and is also associated with the second agent, the processor invokes the second agent in the same visit to the object that the first agent is invoked.

The invention can be implemented to achieve one or more of the following advantages. The method can identify the type of objects that may be not have all the required properties set. The method identifies potentially harmful objects that are masqueraded as one type but are actually of a second different type. It also allows the agents to revisit objects that have multiple classification types, thereby allowing agents to process all the objects that they are associated with. By calling different agents on the same visit to an object, the framework reduces the resources required to process the document. Thus the invention can be used to rid documents of potential harmful objects and to correct errors in the objects contained in the document in an efficient way.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 is a block diagram of a computer system for processing a directed graph using a framework in accordance with the invention for invoking agents.

FIG. 2 is a block diagram of a PDF document represented as a directed graph of objects.

FIG. 3 shows registration information associating the agents of FIG. 1 with certain types of objects of FIG. 2.

FIG. 4 is a flow chart of a process implemented by the framework of FIG. 1 to traverse the document of FIG. 2.

FIGS. 5A–5D are excerpts of tables used by the framework of FIG. 1 to determine the types of the objects of FIG. 2.

FIGS. 6A–6C are flow charts of the process implemented by the framework of FIG. 1 to determine the types of the objects of FIG. 2.

FIG. 7A is a flow chart of a process implemented by the framework of FIG. 1 to determine whether the objects of FIG. 2 have a more specific type.

FIG. 7B is a flow chart of a process implemented by the framework of FIG. 1 to determine whether the objects of FIG. 2 have a more generic type.

FIG. 8 is a flow chart of the process implemented by the framework to invoke the agents of FIG. 1 to process the objects of FIG. 2.

Like reference symbols in the various drawings indicate like elements.

DETAILED DESCRIPTION

As shown in FIG. 1, a computer system 10 for processing a document 20 includes a processor 14 and a storage subsystem 16. Storage subsystem 16 may include memory, a CDROM drive, a floppy disk, a hard drive, a disk array, and so on. Storage subsystem 16 contains data 18, such as a document 20 arranged as a directed graph of objects 22.

The document is a PDF™ document that can be displayed using Adobe Acrobat™, by Adobe Systems Inc. Storage subsystem 16 also includes object classification tables 24 for classifying the objects 22 into different types. Storage subsystem 16 also includes computer programs that are executed by the processor 14 to process document 20. The computer programs may be written in a programming language such as "C" and compiled into computer executable. The computer programs include document-processing agents 26 for processing objects 22 contained within document 20. Agents 26 are computer program code modules.

The computer programs further include a document-processing framework 28, which uses a traversal stack 30 and a hash table 32 to traverse the document 20 and visit objects 22 as will be described below. The document-processing framework 28 uses the object classification tables 24 to determine a type for each of the objects 22. Based on agent registration information 34 and the determined type of the object, the document-processing framework 28 invokes the agents 26 to process objects 22 as they are visited. The object classification tables 24 and the agent registration information 34 may be stored in memory to speed the processing of the documents. This may be achieved, for example, by compiling them into the document-processing framework 28.

Referring to FIG. 2, the PDF document 20 is arranged as a directed graph of objects 50–78. The document has a root object 50, with a basic type "Catalog", which is the parent of a child object 52 that has a basic type "Pages." Object 52 is in turn a parent of a child object 56 that is the parent of the pages contained within the document. Object 56 is the parent of a first page object 58 corresponding to a page within the document 20 and a second object 60. Page object 58 contains a child object 62, which is the parent of objects representing annotations in the page represented by page object 58. Object 60, which is actually a file attachment annotation, is a child of object 62. Object 60 may be executed by a computer to achieve harmful results and is masqueraded as a page object (i.e. child of object 56) to keep it from being detected. One of the agents 26 (Agent C) is configured to detect and eliminate such potentially harmful, masqueraded objects.

Object 62 is also the parent of annotation objects 64,66. Annotation object 66 in turn has a child object 68 representing an appearance of the annotation of object 66.

Object 50 is also the parent of a second child object 70, which, in turn, is the parent of a child object 72. Object 72 is the parent of object 76, which is supposed to represent a page of the document 20. However, object 76 has been positioned as a child of object 72 instead of being positioned as a child of object 56. Consequently, the page represented by object 76 may not be properly displayed. One of the agents 26 (Agent D) detects such misplaced objects and moves them to their correct location in the directed graph of objects.

Object 72 is the parent of a second object 74 representing a form contained within the document 20. The form object 74 has a child 78, which is a parent of the fields contained within the form. Among the children of the object 78 are annotation objects 64, 66, which were described above.

Each object has properties and each property has a value. For example, a "basic type" property 79 of annotation object 64 has a value "Anote" 80, while a "basic type" 81 of annotation object 66 has a value "Annot" 82. The basic type 80 of annotation 64 should actually be "Annot" but is misspelled as "Anote." Consequently, the annotation represented by object 64 may not be properly displayed. One of the agents 26 (Agent D) is configured to detect and correct such malformed annotations.

As shown in FIG. 3, the agents 26 are associated with object types by registration information 34. The agents submit the registration information 34 to framework 28 and the framework 28 invokes the agents 26 based on the registration information 34. Information 92 is associated with agent A, which translates text or strings contained within document 20 from one language, such as English, to another language, such as French Information 92 includes the type of object 100 that agent A is interested in, i.e., "DT_COSSTRING." Information 92 also contains an indication 102 that the agent A is not interested in subclasses of the object type 100, and an indication 104 that the agent A does not need to revisit any object if the framework 28 revisits the object while traversing the document.

Similarly, registration information 94 for a cataloguing agent B associates agent B with objects of type "DT_ALL," indicates that agent B is not interested in subclasses of that object and that agent B would like to be invoked whenever the framework 28 revisits an object whose type was previously unknown. The type "DT_ALL" is a special type that indicates that the agent would like to visit all object types. The registration information 94 allows the cataloguing agent to visit all objects of known type once and to keep statistics of the quantities of each object type in the document Information 96 for document validation agent D indicates that agent D should be invoked for all objects (type "DT_ALL"), that the agent D is not interested in sub-classes of objects, and that agent D should be invoked whenever an object is reclassified under a different type or an unknown object is revisited. Agent D checks an object to ensure that it has all the required properties for its object type. If an object does not have the required properties set, the validation agent reports the invalid object to a human operator. For example, agent D would report or correct malformed annotation 80 (FIG. 2). The validation agent also moves misplaced objects to reposition them at their correct location within the directed graph. For instance, agent D would move misplaced object 76 to make it a child of object 56 (FIG. 2).

Information 98 is associated with agent C, which detects potentially harmful objects within the document 20, such as object 60 (FIG. 2). Information 98 directs the framework 28 to invoke Agent C for the listed object types 106, which could be used for harmful purposes. The information 98 also indicates 108 that agent C should be invoked for objects that are subclasses of the listed object types, and that agent C should be invoked whenever objects are reclassified. By revisiting reclassified objects, agent C can detect potentially harmful object 60, which is masqueraded as a page object but is also classified as an annotation. Agent C can, for example, be configured to either report the potentially harmful objects to a human operator or to automatically delete them.

Referring to FIG. 4, the process implemented by the framework 28 to traverse the document 20 will be described. The process begins by initializing (402) the traversal stack 30 and the hash table 32 used in traversing the document. The traversal stack 30 is used to store an identity of the path that was traversed to reach the current object while the hash table 32 is used to record the identity information of all objects that have been previously visited and the determined type for the objects. The framework 28 selects (404) a first object 22 in the document 20 as the current object. For example, in the PDF document 20 (FIG. 2), the framework 28 would select the root object 50 as the current object The framework 28 checks (406) if the current object is already in the traversal stack 30, to determine if there is a closed loop of parent-child relationships. If the current object is already in the stack 30, then the current object has already been processed and the framework 28 checks (426) if the current object is the last child of the object on top of the stack 30.

Otherwise if the current object is not in the stack 30, the framework 28 determines (408) the classification type of the current object as described below with reference to FIGS. 6A–6C. The framework 28 determines (410) whether the current object has previously been visited based on the information on the hash table. The framework 28 uses the classification type and the information from previous visits to the object to identify (412) processing agents that should be invoked to process the current object, as described below with reference to FIG. 8. The framework 28 then invokes or calls (414) each of the identified processing agents for the current object, causing the agents to process the current object For instance, if multiple agents are identified for the current object, the agents are called in sequence, allowing the multiple agents to process the document in a single traversal of the document. The agents may alternatively be called in parallel in a suitably equipped computer system, so long as the agents perform functions that can be performed concurrently. The process updates (416) the hash table 32 with an identity of the current object and the classification type of the current object to reflect that the object has been visited.

The framework 28 then checks (418) if the current object is a parent to any child objects. If the current object is a parent, the framework 28 pushes (420) the current object on the stack 30 and selects (422) the first child of the current object to be the new current object The framework 28 then processes (406–418) the new current object as described above. If the current object has no children, the framework 28 checks (424) if there is an object on the stack 30. If there is no object on the stack 30 then the traversal of the document is complete.

Otherwise if there is an object on the stack 30, the framework 28 checks (426) if the current object is the last child of the object on top of the stack 30. If it is not the last child of the object on top of the stack 30, the framework 28 selects (428) the next child of the object on top of the stack 30 as the current object and processes (406–426) the new current object as described above. Otherwise, if the current object is the last child of the object on top of the stack 30, the framework 28 selects (430) the object on top of the stack 30 as the current object and pops (432) the current object off the stack 30. The framework 28 then processes (424–432) the other children of the parent of the current object. Thus the framework 28 traverses the document in a depth-first fashion using traversal stack 30 to break out of cyclical parent-child loops.

As shown in FIG. 5A, a document parse table 120 that is used by the framework 28 to identify the classification type of an object has rows 122, each of which represents a different object type. The name of the object type corresponding to each row is in a deduced-type column 124 of the table. The object-type in column 124 maybe marked with a "$" to indicate that object has a more specific type, as discussed below with reference to FIG. 5D. The other columns 126–134 contain the properties that must be met by an object to be classified as the type in column 124. The first column 126 contains a type that the parent of an object must have to be classified as the type in column 124. Parent-type column 126 makes the classification of an object dependent on the path traversed by the framework 28 before arriving at the object. Since the classification of the parent may have been deduced based on table 120, the classification of an object indirectly depends on the classification of its parent, grandparent, and so on.

The second column 128 contains a basic type property of the object that must be matched by the object, while the third column 130 is a source key of the parent object that must be matched by the object to be classified as the type of column 124. For example, the source key 77 of the parent of object 78 (FIG. 2) is "Kids." For rows representing types where the source key 130 does not affect the classification, the source key is marked as "N/A." The third column 132 contains "bonus" property requirements that must be matched by an object to be classified as the type of column 4. In certain rows, column 132 contains a property/value pairs that must be matched by an object. For example, the second row 136 has a "bonus" requirement that the basic type property of an object is "Annot." However, in other rows, column 132 may only require that an object have a property defined irrespective of the value assigned to the property. Column 132 may have multiple properties or property/value pairs separated by commas. An object meets the requirements of column 132 so long as the object matches at least one bonus property or property/value pair in the column. The number of matching properties. and property/value pairs is referred to as a "bonus" score and is used to choose a preferred type when more than one matching type is found. The preferred type is the type corresponding to the row with the greatest bonus score. Column 134 contains lumped properties and property/value pairs that must all be met for the requirement of the column to be matched. So long as an object does not meet one property or property/value pair, the object fails the requirement of the "lumped" column 134.

An asterisk 138 indicates that an object that meets the conditions to the left of the asterisk ("sufficient conditions") can be classified as the type corresponding to the row, even if the object does not meet the conditions to the right of the asterisk. For example, in row 139 the asterisk indicates that objects with parent type "DT_CATALOG," object type "CosDict," and source key "Pages" may be classified as type "DT_PAGESNODE," even if they do not meet the requirements of columns 132 and 134. Thus, the framework can identify an object that has certain properties incorrectly set or missing so long as the sufficient conditions are met.

As shown in FIG. 5B, a second table 140 is used to identify the classification type of an object that cannot be classified using the first table 120 (FIG. 5A). The second table 140 includes a set of rows 142, each of which corresponds to a different classification type. The classification type for each row is in column 144. The conditions that must be met by an object to be classified as the type of column 144 are in columns 146 and 148. Column 146 shows the value of the "basic type" property that the object must have while column 148 shows the value of the "sub-type property" that the object must have. Since table 140 does not depend on the parent of the object, it can be used to identify objects, such as page object 76 (FIG. 2), which are misplaced within the document.

The classification types may be grouped into more generic types for convenience. For example, a more generic type containing multiple specific types may be defined so that an agent can register for that more generic type instead of registering for each of the specific types. The generic types may, for example, reduce the size of the tables or make the registration process simpler. FIG. 5C shows a table 150 relating specific types to corresponding generic types. Each row 152 corresponds to a specific type shown in a column 154. A column 156 shows the generic type corresponding to the specific type of column 154. As shown in rows 158, multiple specific types may be mapped to the same generic type, allowing an agent for processing both specific types to only register for the generic type.

As shown in FIG. 5D, a table 160 that is used to determine specific types for the generic types has rows 162 each of which corresponds to a specific type. A column 164 contains the specific type while columns 166 and 168 contain the requirements that must be met by an object to be classified as the specific type. Column 166 contains the generic type and column 168 contains additional property/value pairs that must be matched by the object to be classified as the specific type of column 164.

As shown in FIGS. 6A–6C, the process of identifying a classification type of an object begins by getting (6002) the object. The framework 28 then initializes (6004) the process by setting the best_guess_type to "DT_UNKNOWN," the best_guess_column to zero, best_guess_specific to zero, and parent type to the type of the parent of the object. Best_guess_type represents the best guess of the type of the object at the time and is set to "DT_UNKNOWN" to indicate that the type of the object is unknown. The best_guess_column is set to zero to indicate that none of the columns of table 120 (FIG. 5A) is matched in the current best_guess_type. Best_guess_specific is set to zero to indicate that the current best_guess_type does not have a more specific type.

The framework 28 checks (6006) whether the basic type of the object is "COS_NULL," indicating that the object is a null object. If it is, the framework 28 sets (6008) the best guess category type to "DT_NULL" and terminates the process of identifying the object type. Otherwise if the basic type of the object is not "COS_NULL," the framework 28 checks (6010) whether parent_type is "DT_UNKNOWN," indicating an unknown type of parent. If the parent type is "DT_UNKNOWN" the framework sets (6012) best_guess_type to "DT_UNKNOWN" and proceeds to determine the classification type of the object using table 140 (FIG. 5B), which does not require a parent type. The framework compares (6038) the basic type and subtype of the object with columns 146 and 148 of table 140. The framework then checks (6040) if the object matches any of the rows 142. If the object does not match any of the rows, the framework 28 adds (6044) the best_guess_type of the object to a list of matching types for the object. Otherwise, if the object matches one of the rows 142, the framework 28 sets (6042) the best_guess_type to the deduced type column 144 of the matching row before adding (6044) the best_guess_type of the object to a list of matching types for the object. The framework then adds (6046) generic types of the best_guess_type of the object to the list of matching types of the object, as described below with reference to FIG. 7A, and terminates the process of identifying the object type.

Otherwise if the parent type is not "DT_UNKNOWN," the framework 28 proceeds to determine the classification type of the object using table 120 (FIG. 5A). The framework checks (6014) if parent_type is in column 126 of table 120. If it is not, the framework uses FIG. 5C to lookup (6016) a generic object type corresponding to parent_type. The framework then checks (6018) whether a generic object type was found for parent_type. If a generic object type was not found, the framework proceeds to identify a type for the object based on table 140 (FIG. 5B), as previously described, by comparing (6038) the basic type and subtype properties of the object with the corresponding columns of table 140. Otherwise if a generic type for parent_type is found, the framework sets parent_type to the generic type (6020) and checks (6014) if the new parent_type is in column 126 of table 120 (FIG. 5A).

If parent_type is in column 126 of table 120, the framework sets (6022) parent_type_rows to be the rows of table 120 that have column 126 equal to parent_type. The framework 28 then sets (6024) row_list to be the set of rows in parent_type_rows which have a value in column 128 that is equal to the basic type value of the object. Thus the framework selects the rows that have a parent type value and a basic type value that is matched by the object. The framework then sets (6026) the current row to be the first row in row_list and initializes the comparison of the conditions of the current row with the object by setting (6028) the column number to one and the bonus score to zero.

The framework then checks (6030) whether the basic type column 128 is marked with an asterisk to indicate that the parent type and the basic type are sufficient conditions for an object to match classification type represented by the current row. If an asterisk does not mark the basic type column 128 of the current row, the framework 28 sets (6036) the column number to 2 and proceeds to check (6050) if the source key of the parent of the current object matches the source key column 130 of the current row. Otherwise, if the basic type column is marked with an asterisk, the framework 28 checks (6032) whether the column number is greater than best_guess_column, indicating that the current object has matched more columns of the current row than the previous best guess type. If the column number is less than best_guess_column, the framework 28 sets (6036) the column number to 2 and proceeds to check (6050) if the source key of the parent of the current object matches the source key column 130 of the current row. Otherwise, if the column number is greater than or equal to best_guess_column, the framework sets the deduced type 124 of the current row to be the best-guess type by setting (6034) the best_guess_type to the deduced type 124 of the current row, the best_guess_bonus to be the bonus score, the best_guess_column to be the column number, and the best_guess_more_specific to be true if the new best_guess_type has a corresponding specific type, as indicated by a "S" symbol in the deduced type column 124 of the current row.

The framework 28 sets (6036) the column number to 2 and checks (6050) if the source key of the parent of the current object matches the source key column 130 of the current row. Any source key value is considered to match a column value of "N/A." If the source key does not match, the framework 28 proceeds to check (6098) if there are any more rows in row-list to be matched with the object. Otherwise, if the source key matches, the framework 28 checks (6052) whether the source key column 130 of the current row is marked with an asterisk, to indicate that the parent type 126, the basic type 128, and source key 130 are sufficient conditions for an object to match classification type represented by the current row. If the source key is not marked with an asterisk, the framework proceeds to set (6058) the column number to three and compare the bonus column 152 of the current row with the corresponding properties of the object. Otherwise, if the source key is marked, the framework checks (6054) whether the column number is greater or equal to best_guess_column, indicating that the object matches more columns of the current row than the columns of the current best guess type. If the column number is less than best_guess_column, the framework proceeds to set (6058) the column number to three and compare the bonus column 152 of the current row with the corresponding properties of the object. Otherwise, if the column number is greater than or equal to best_guess_column, the framework sets the deduced type 124 of the current row to be the best-guess type by setting (6056) the best_guess_type to the deduced type 124 of the current row, the best_guess_bonus to be the bonus score, the best_guess_column to be the column number, and the best_guess_more_specific to be true if the new best_guess_type has a corresponding specific type.

The framework 28 sets the column number to 3 (6058) and sets (6060) num_bonus to be the number of bonus conditions in the bonus column 132 of the current row. The framework then checks (6062) whether num_bonus is greater than zero. If num_bonus is equal to zero, the framework proceeds to set (6080) the column number to four and compare the "lumped" column 134 of the current row with the corresponding properties of the object. Otherwise if num_bonus is greater than zero, the framework 28 sets (6064) num_matches to be the number of the bonus requirements of the current row matched by the object and sets (6066) the bonus score to be the ratio of num_matches to num_bonus. The framework checks (6068) if the bonus score is greater than zero. If the bonus score is equal to zero, the framework 28 proceeds to check (6098) if there are any more rows in row-list to be matched with the object. Otherwise, if the bonus score is greater than zero, the framework 28 checks (6070) whether the bonus column 132 of the current row is marked with an asterisk, to indicate that the parent type 126, the basic type 128, the source key 130, and the bonus column 132 are sufficient conditions for an object to match classification type represented by the current row. If the bonus column 132 is not marked with an asterisk, the framework proceeds to set (6080) the column number to four and compare the "lumped" column 134 of the current row with the corresponding properties of the object. Otherwise, if the bonus column is marked sufficient, the framework checks (6072) whether the column number is equal to best_guess_column, indicating that the object matches as many columns of the current row as the previous best matched classification type. If the column number is equal to best_guess_column, the framework checks (6076) whether the bonus score is greater than best_guess_bonus, indicating that the object matches more bonus values of the current row than the bonus values of the row corresponding to the previously-identified best guess object. If the bonus score is less than the best_guess_bonus, the framework proceeds to set (6080) the column number to four and compare the "lumped" column 134 of the current row with the corresponding properties of the object. Otherwise, if the bonus score is greater than the best_guess_bonus, the framework 28 sets (6078) the current row to be the best_guess_type.

Otherwise if the column number is not equal to best_guess_column, the framework checks (6074) if the column number is greater than best_guess_column, indicating that the object matches more properties of the current row than the previously-identified best guess type. If the column number is less than best guess column, the framework proceeds to set (6080) the column number to four and compare the "lumped" column 134 of the current row with the corresponding properties of the object. Otherwise, if the column number is greater than best_guess_column, the framework sets (6078) the deduced type 124 of the current row to be the best-guess type by setting the best_guess_type to the deduced type 124 of the current row, the best_guess_bonus to be the bonus score, the best_guess_column to be the column number, and the best_guess_more specific to be true if the new best_guess_type has a corresponding specific type.

The framework 28 sets the column number to four (6080) and sets (6082) num_required to be the number of properties and property/value pairs in the "lumped" column 134 of the current row. The framework then checks (6084) whether num_required is greater than zero. If num_required is equal to zero, the framework proceeds to check (6098) if there are any more rows in row-list to be matched with the object. Otherwise if num_required is greater than zero, the framework 28 sets (6086) num_matches to be the number of "lumped" properties or property/value pairs of the current row matched by the object. The framework checks (6088) if num_required is equal to num_matches. If num_required is not equal to num_matches, the framework 28 proceeds to check (6098) if there are any more rows in row-list to be matched with the object. Otherwise, if num_required is equal to num_matches, the framework checks (6090) whether the column number is equal to best_guess_column, indicating that the object matches as many columns of the current row as the previous best matched classification type. If the column number is equal to best_guess_column, the framework checks (6094) whether the bonus score is greater than best_guess_bonus, indicating that the more bonus values of the current row have been matched by the object than by the previously-identified best guess object. If the bonus score is less than the best_guess_bonus, the framework proceeds to check (6098) if there are any more rows in row-list to be matched with the object. Otherwise, if the bonus score is greater than the best_guess_bonus, the framework 28 sets (6096) the current row to be the best_guess_type.

Otherwise if the column number is not equal to best_guess_column, the framework checks (6092) if the column number is greater than best_guess_column, indicating that the object matches more columns of the current row than the previously-identified best guess type. If the column number is less than best_guess_column, the framework proceeds to check (6098) if there are any more rows in row-list to be matched with the object. Otherwise, if the column number is greater than best_guess_column, the framework sets (6096) the deduced type 124 of the current row to be the best-guess type by setting the best_guess_type to the deduced type 124 of the current row, the best_guess_bonus to be the bonus score, the best_guess_column to be the column number, and the best_guess_more_specific to be true if the new best_guess_type has a corresponding specific type.

The framework checks (6098) if there are any more rows in row_list to be matched against the object. If there are more rows in row_list, the framework sets the current row to the next row in row_list and proceeds to initialize (6028) the comparison of the new current row with the object. Thus the framework compares selected rows of the table 120 with the object and determines a best guess for the classification type of the object.

Otherwise if there are no more rows in row-list, the framework checks (6102) if best_guess_type is equal to "DT_UNKNOWN," indicating that the object still has an unknown type. If best_guess_type is equal to "DT_UNKNOWN," the framework 28 looks up (6016) a generic type for the parent type of the object and repeats the process (6016–6102) of comparing rows of table 120 selected based on the generic type with the object. Otherwise, if best_guess_type is not equal to "DT_UNKNOWN," the framework adds (6104) best_guess_ type to the list of matching types for the object. The framework then checks (6106) if best_guess_specific is true, indicating that a more specific type for the best_guess_type exists. If best_guess_specific is not true, the framework proceeds to add (6110) generic types for best_guess_type to the list of matching types for the object before terminating the process of identifying the type of the object.

Otherwise, if best_guess_specific is true, the framework adds (6108) specific types for the best_guess_type to the list of matching types as described below with reference to FIG. 7A. The framework then adds (6110) generic types for best_guess_type to the list of matching types for the object. The framework then terminates the process of identifying the type of the object.

As shown in FIG. 7A, the process for determining a more specific type for the best_guess_type begins by initializing 700 the determination by setting the deduced subtype to DT_NULL and test type to best_guess_type. The framework 28 then checks 702 whether any of the rows 162 of table 160 have a generic type column 166 with a value equal to test_type. If none of the rows does, then the framework proceeds to lookup a generic type for test type in FIG. 5C (718). Otherwise, if some of the rows do, the framework 28 selects (704) and checks (706) whether the object matches the key/value column 168 of the selected row. If the object does not match, then the framework 28 proceeds to check (714) if the selected row is the last of the rows with a generic type column 166 with a value equal to test_type. Otherwise if the object matches, the framework sets (708) the deduced type to be the specific type column 164 value of the selected row. The framework 28 then checks (710) if the deduced type has a value of "DT_NULL." If the deduced type does not, then the framework adds (712) the deduced type to the list of types for the object and terminates the process of identifying specific types for the best_guess_type.

Otherwise, if the deduced type has a value of "DT_NULL," the framework checks (714) if the selected row is the last of the rows matched by the object. If it is not the last, the framework selects (716) the next of the matching rows and proceeds to check (706) if the object matches the key/value column 168 of the current row. Otherwise if the selected row is the last, then the framework looks up (718) a generic type for test type in FIG. 5C. The framework then checks (720) if any of the rows 152 of table 150 (FIG. 5C) have a specific type column 154 value equal to the test type. If none of them do then the process is terminated. Otherwise if one of the rows 152 does, the framework sets (722) the test type to the generic type column 156 value of the matching one of the rows 152. The framework then checks (702) if a row in FIG. 5D has a generic type column 166 value equal to the test type. Thus the framework identifies a specific classification type associated with the best_guess_type and adds it to the list of types matched by the object.

As shown in FIG. 7B, the process for adding generic types of best_guess_type begins by setting (750) test type to best_guess_type. The framework then looks up (752) a generic type for test type in FIG. 5C. The framework then checks (754) if any of the rows 152 of table 150 (FIG. SC) have a specific type column 154 value equal to the test type. If none of them do then the process is terminated. Otherwise if one of the rows 152 does, the framework sets (722) the generic type of the matching row to the list of classification types for the object. Thus the framework 28 and a generic type for the best guess object type to the list of identified types for the object.

As shown in FIG. 8, the process for identifying and calling agents associated with an object begins when the framework gets (800) the agents associated with the object by looking up the object type in the object type column 100 of the association information 34 (FIG. 3). The framework checks (802) if the object has previously been visited by checking if an identity of the object is stored in the hash table 32. If the object has not previously been visited, the framework calls (804) all agents that are registered to process the object. Otherwise, if the object has previously been visited, the framework checks (806) if the object has been reclassified by comparing the identified classification type of the object with the classification type of the object stored in the hash table 32. If object has been reclassified, the framework calls (808) all agents that are registered to revisit reclassified objects. For example, for the agents of FIG. 3, the framework 28 would call agents C and D. The framework then checks (810) whether the identified classification type of the object is "DT_UNKNOWN," indicating that the object is of unknown type. If the object is not of type "DT_UNKNOWN," the framework terminates the process of determining and calling agents for the object. Otherwise if the object is of type unknown, the frame calls (812) all agents that are registered to revisit unknown objects. For example, for the agents of FIG. 3, the framework 28 would call the agents B and D, which are registered to revisit unknown objects. Thus the framework 28 calls multiple agents on a single visit to an object, thereby requiring fewer resources to process a document.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of embodiments of the invention have been described. Nevertheless, it will be understood that various modifications may be made without departing from the spirit and scope of the invention. For example, steps of the invention can be performed in a different order and still achieve desirable results. Accordingly, other embodiments are within the scope of the following claims.

What is claimed is:

1. A method of identifying the type of an object having a set of properties, each property being assigned a value, the method comprising:

receiving a first set of properties characteristic of a first type of object, the first type of object being associated with a representation of a document as a directed graph of objects, the first set of properties being divided into a first subset of sufficient properties and a first subset of additional properties; and determining whether the object is of the first type based only on whether the properties in the first subset of sufficient properties are matched by the object.

2. The method of claim 1 further comprising receiving values associated with at least some of the properties in the first subset, determining whether the object is of the first type being further based on whether the values associated with the properties in the first subset match values of corresponding properties of the object.

3. The method of claim 1 wherein the first subset of properties includes a bonus group of properties, determining whether the object is of the first type further including:

comparing the properties in the bonus group with properties of the object; and if at least one property in the bonus group is matched by the properties of the object, identifying the object as the first type.

4. The method of claim 1 wherein the first subset of properties includes a lumped group of properties, determining whether the object is of the first type further including:

comparing the properties in the lumped group with the properties of the object; and if the each property in the lumped group is matched by the properties of the object, identifying the object as the first type.

5. The method of claim 2 wherein the first subset includes a property of the parent of the object, the method further comprising receiving a value associated with the property of the parent.

6. The method of claim 5 wherein the property of the parent of the object is a type of the parent of the object.

7. The method of claim 1 further comprising:

receiving a second set of properties characteristic of a second type of object, the second set of properties being divided into a second subset of sufficient properties and a second subset of additional properties;

determining whether the object is of the second type based only on whether the properties in the second subset of sufficient properties are matched by the object;

comparing the properties in the first set of properities are matched by the object;

comparing the properties in the second set of properties with the properties of the object to determine how many of the properties in the second set of properties are matched by the object:

determining which of the first type and the second type is a preferred type of the object based on whether the object matches more of the properties in the first set of properties than in the second subset of additional properties.

8. A computer program product tangibly stored on a computer-readable medium, for identifying the type of an object having a set of properties, each property being assigned a value, the product comprising instructions operable to cause a programmable processor to:

receive a first set of properties characteristic of a first type of object, the first type of object being associated with a representation of a document as a directed graph of objects, the first set of properties being divided into a first subset of sufficient properties and a first subset of additional properties; and determine whether the object is of the first type based only on whether the properties in the first subset of sufficient properties are matched by the properties of the object.

9. The computer program product of claim 8 wherein the instructions are further operable to cause the processor to receive values associated with at least some of the properties in the first subset, determining whether the object is of the first type being further based on whether the values associated with the properties in the first subset match values of corresponding properties of the object.

10. The computer program product of claim 8 wherein the first subset of properties includes a bonus group of properties, determining whether the object is of the first type further including:

comparing the properties in the bonus group with the properties of the object; and if at least one property in the bonus group is matched by the properties of the object, identifying the object as the first type.

11. The computer program product of claim 8 wherein the first subset of properties includes a lumped group of properties, determining whether the object is of the first type further including:

comparing the properties in the lumped group with properties of the object; and if each property in the lumped group is matched by the properties of the object, identifying the object as the first type.

12. The computer program product of claim 9 wherein the first subset of properties includes a property of a parent of the object, the instructions further causing the process to receive a value of the property of the parent.

13. The computer program product of claim 12 wherein the property of the parent of the object is a type of the parent of the object.

14. The computer program product of claim 8 wherein the instructions further cause the processor to:

receive a second set of properties characteristic of a second type of object, the second set of properties being divided into a second subset of sufficient properties and a second subset of additional properties;

determine whether the object is of the second type based only on whether the properties in the second subset of sufficient properties are matched by the properties of the object;

compare the properties in the first set of properties with the properties of the object to determine how many of the properties in the first set of properties are matched by the object;

compare the properties in the second set of properties with the properties of the object to determine how many of the properties in the second set of properties are matched by the object;

determine which of the first type and the second type is a preferred type of the object based on whether object matches more of the properties in the first set of properties than in the second set of properties.

15. A computer program product, tangibly stored on a computer-readable medium, for providing a framework for processing an electronic document having content organized as a direct graph of objects, the product comprising instructions operable to cause a programmable processor to:

receive an input identifying an electronic document having content organized as a directed graph of objects, where each object has a set of properties and each property is assigned a value;

receive associating information associating one or more requested object types with a first agent, the first agent being a computer program code module;

traverse the directed graph, visiting objects in the electronic document;

identify the type of each visited object to determine whether the visited object is of one of the requested object types; and if the visited object is of the requested object types, invoke the first agent to process the visited object;

wherein, if there is more than one path to an object in the directed graph, the object may be visited more than once in a traversal of the document and the instructions cause the processor to determine whether or not to invoke the agent on more than one of the visits based on the associating information.

16. The computer program product of claim 15, wherein the instructions cause the processor to record an identity of each visited object and the associating information causes the processor not to invoke the on a visit to an object whose identity has already been recorded.

17. The computer program product of claim 15, wherein the instructions cause the processor to record an identity and a type of each visited object and the associating information causes the processor to only invoke the agent on a visit to an object whose identity has already been recorded if the recorded type of the object is different from the identified type of the object.

18. The computer program product of claim 15, wherein the instructions cause the processor to:

receive associating information associating one or more object types with a second agent, the second agent being a computer program code module;

determine whether a visited object is associated with the second agent based on the identified type of the visited object; and if the visited object is of the requested types and is also associated with the second agent, invoke the second agent in the same visit to the object that the first agent is invoked.

19. The computer program product of claim 15, wherein the instructions cause the processor to identify the type of the object by:

receive a first set of properties characteristic of a first type of object, the first type of object being associated with a representation of a document as a directed graph of objects, the first set of properties being divided into a first subset of sufficient properties and a first subset of additional properties; and determine whether the object is of the first type based only on whether the properties in the first subset of sufficient properties are matched by the properties of the object.

20. The computer program product of claim 19 wherein the instructions are further operable to cause the processor to receive values associated with at least some of the properties in the first subset, determining whether the object is of the first type being further based on whether the values associated with the properties in the first subset match values of corresponding properties of the object.

21. The computer program product of claim 19 wherein the first subset of properties includes a bonus group of properties, determining whether the objects is of the first type further including:

comparing the properties in the bonus group with the properties of the object; and if at least one property in the bonus group is matched by the properties of the object, identifying the object as the first type.

22. The computer program product of claim 19 wherein the first subset of properties includes a lumped group of properties, determining whether the object is of the first type further including:

comparing the properties in the lumped group with properties of the object; and if each property in the lumped group is matched by the properties of the object, identifying the object as the first type.

23. The computer program product of claim 19 wherein the first subset of properties includes a property of a parent of the object, the instructions further causing the process to receive a value of the property of the parent.

24. The computer program product of claim 23 wherein the property of the parent of the object is a type of the parent of the object.

25. The computer program product of claim 19 wherein the instructions further cause the processor to:

receive a second set of properties characteristic of a second type of object, the second set of properties being divided into a second subset of sufficient properties and a second subset of additional properties;

determine whether the object is of the second type based only on whether the properties in the second subset of sufficient properties are matched by the properties of the object;

compare the properties in the first set of properties with the properties of the object to determine how many of the properties in the first set of properties are matched by the object;

compare the properties in the second set of properties with the properties of the object to determine how many of the properties in the second set of properties are matched by the object;

determine which of the first type and the second type is a preferred type of the object based on whether object matches more of the properties in the first set of properties than in the second set of properties.

26. The computer program product of claim 25 wherein the first subset of properties includes a bonus group of properties and a lumped group of properties, determining whether the object is of the first type further including:

comparing the properties in the bonus group with the properties of the object;

comparing the properties in the lumped group with properties of the object; and if at least one property in the bonus group is matched by the properties of the object and each property in the lumped group is matched by the properties of the object, identifying the object as the first type.

* * * * *

UNITED STATES PATENT AND TRADEMARK OFFICE
CERTIFICATE OF CORRECTION

PATENT NO. : 6,604,105 B1
DATED : August 5, 2003
INVENTOR(S) : Jason A. Roth

It is certified that error appears in the above-identified patent and that said Letters Patent is hereby corrected as shown below:

<u>Title page,</u>
Item [74], replace "Fish and Richardson, P.C." with -- Fish & Richardson P.C. --.

<u>Column 14,</u>
Line 55, replace "properities" with -- properties --.

<u>Column 16,</u>
Line 30, between "invoke the" and "on a visit" insert -- agent --.

<u>Column 17,</u>
Line 6, replace "objects is" with -- object is --.

Signed and Sealed this

Thirtieth Day of September, 2003

JAMES E. ROGAN
*Director of the United States Patent and Trademark Office*